(12) United States Patent
Grove et al.

(10) Patent No.: US 7,118,313 B2
(45) Date of Patent: Oct. 10, 2006

(54) CUTTING DIE HEAD

(75) Inventors: Kevin D. Grove, Evans, GA (US); James M. Blitchington, Martinez, GA (US); David W. Weathers, Martinez, GA (US); Curtis L. Bryant, Sr., Evans, GA (US)

(73) Assignee: Kennametal Inc., Latrobe, PA (US)

( * ) Notice: Subject to any disclaimer, the term of this patent is extended or adjusted under 35 U.S.C. 154(b) by 168 days.

(21) Appl. No.: 10/865,278

(22) Filed: Jun. 10, 2004

(65) Prior Publication Data

US 2005/0276671 A1 Dec. 15, 2005

(51) Int. Cl.
*B23G 5/10* (2006.01)
*B23G 5/12* (2006.01)

(52) U.S. Cl. .................. 408/74; 408/154; 408/221

(58) Field of Classification Search .......... 408/74, 408/154, 221, 73, 153, 158, 56, 57, 147, 408/1 R; 470/66, 70; 72/102, 104
See application file for complete search history.

(56) References Cited

U.S. PATENT DOCUMENTS

| | | | |
|---|---|---|---|
| 1,038,670 A | 9/1912 | Smith | |
| 1,057,014 A | 3/1913 | Smith | |
| 1,085,762 A | 2/1914 | Smith | |
| 1,474,179 A | 11/1923 | Smith et al. | |
| 1,639,719 A * | 8/1927 | Breitenstein | 408/149 |
| 1,732,358 A * | 10/1929 | Furlong et al. | 408/160 |
| 1,846,296 A * | 2/1932 | Williamson | 408/74 |
| 1,872,059 A * | 8/1932 | Breitenstein | 408/73 |
| 1,952,205 A | 3/1934 | Hogg | |
| 2,018,523 A | 10/1935 | Hogg | |
| 2,022,273 A * | 11/1935 | Breitenstein | 408/74 |
| 2,026,471 A * | 12/1935 | Hoelzel | 470/188 |
| 2,130,119 A | 9/1938 | Dissner | |
| 2,195,837 A * | 4/1940 | Breitenstein | 470/74 |
| 2,253,523 A | 8/1941 | Hogg | |
| 2,271,641 A | 2/1942 | Hogg | |
| 2,387,290 A | 10/1945 | Powell et al. | |
| 2,387,291 A * | 10/1945 | Powell et al. | 408/154 |
| 2,471,250 A * | 5/1949 | Strickland | 470/74 |
| 2,556,742 A * | 6/1951 | Striekland | 470/74 |
| 2,557,069 A * | 6/1951 | Berkey | 470/188 |
| 2,909,087 A | 10/1959 | Powell | |
| 2,958,877 A * | 11/1960 | Strickland | 408/154 |
| 3,082,446 A * | 3/1963 | Benninghoff | 470/188 |
| 3,086,229 A * | 4/1963 | Strickland | 408/149 |
| 3,164,042 A * | 1/1965 | Hanna et al. | 72/121 |

(Continued)

OTHER PUBLICATIONS

Vers-O-Tool® Threading and Hollow Milling Heads, Operator's Handbook, Assembled Threading Tools, Greenfield Industrie, Evans, Georgia, U.S.A., (111-274) (AP2M 888), 34 pages total.

*Primary Examiner*—Monica Carter
*Assistant Examiner*—Michael W. Talbot
(74) *Attorney, Agent, or Firm*—Larry R. Meenan

(57) ABSTRACT

A cutting die head that can be set and/or reset without an external mechanism. To this end, the die head includes a die body including a plurality of radially adjustable blocks, each block having a cutter mounted thereon and a radially outwardly facing cam surface. A sleeve surrounds the die body and has an inner surface. The inner surface has a plurality of cam surfaces arranged to communicate with the cam surfaces of the blocks such that axial movement of the sleeve results in radial movement of the blocks. In one embodiment the sleeve is caused to move axially by fluid pressure.

14 Claims, 4 Drawing Sheets

U.S. PATENT DOCUMENTS

| | | |
|---|---|---|
| 3,188,666 A | 6/1965 | Brown, Sr. et al. |
| 3,365,924 A | 1/1968 | Cummings |
| 3,645,638 A * | 2/1972 | Theuerkauf ................. 408/1 R |
| 3,691,574 A | 9/1972 | Lee |
| 3,735,436 A | 5/1973 | Louys |
| 3,812,548 A | 5/1974 | Theuerkaue |
| 4,024,778 A | 5/1977 | De Fauw |
| 4,132,495 A * | 1/1979 | Baumann et al. ............. 408/74 |
| 4,438,539 A * | 3/1984 | Stephens ................... 470/188 |
| 4,486,130 A | 12/1984 | Lipp |
| 4,530,625 A | 7/1985 | Corley et al. |
| 4,617,816 A * | 10/1986 | Brinkman .................... 72/104 |
| 4,766,750 A * | 8/1988 | Brinkman .................... 72/30.2 |
| 4,924,687 A * | 5/1990 | Francia ....................... 72/102 |
| 5,568,743 A * | 10/1996 | Oppelt ........................ 72/121 |
| 5,797,802 A * | 8/1998 | Nowak et al. .............. 470/185 |

* cited by examiner

CUTTING DIE HEAD

BACKGROUND OF THE INVENTION

1. Field of the Invention

This invention generally relates to a cutting die head; specifically a cutting die head designed for use on a machine tool having a fixed or revolving spindle, wherein the cutting die head does not require an external resetting or setting means.

2. Description of the Related Art

Automatic cutting die heads with external trips and resets are known in the art. U.S. Pat. No. 1,057,014, to O. A. Smith, describes a threading die for use with a stationary spindle that utilizes a lever extending from the die head as a resetting mechanism. Use of such an external lever greatly limits the potential use of the die head.

A cutting die head with an improved mechanism for tripping and resetting is described in U.S. Pat. No. 1,952,205, to W. J. Hogg. This device is described as a die head of simple construction having circular cutters or chasers. The die head utilizes an external mechanism such as a yoke, interacting with a grooved collar to trip and reset the die head. This improved mechanism eliminates the need for a fixed lever on the die head and allows for the die head to be used in rotating as well as stationary spindle applications. However, use of such an external mechanism still limits the die head to what machines it may be used on.

SUMMARY OF THE INVENTION

The invention is directed to a die head that can be reset without an external mechanism. To this end, the die bead of the invention comprises a die body having a front face and a rear face having a rearwardly extending hollow shank terminating in a shank end, a sleeve, a plunger, and a fluid such as, but not limited to: air, oil, or a suitable coolant of a type well known in the art. The front face is has a plurality of slots each provided with a radially adjustable block. Each block has a cutter mounted thereon and a cam surface directed radially outward. The sleeve surrounds the die body and has an inner surface with a plurality of inwardly directed cam surfaces. The cam surfaces of the sleeve are arranged to communicate with the cam surfaces of the blocks in a manner such that axial movement of the sleeve results in radial movement of the blocks. The plunger is positioned within the hollow shank and attached to the sleeve through at least one slot in the hollow shank in a manner such that the sleeve and plunger assembly can slide axially along the hollow shaft a distance delineated by the length of the slot. The fluid is supplied from a reservoir to the shank end. An increase in pressure of the supplied Thud results in the plunger and sleeve assembly being forced toward the front face of the die body causing the blocks and attached cutters to move radially inward setting the die head for a cutting cycle.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
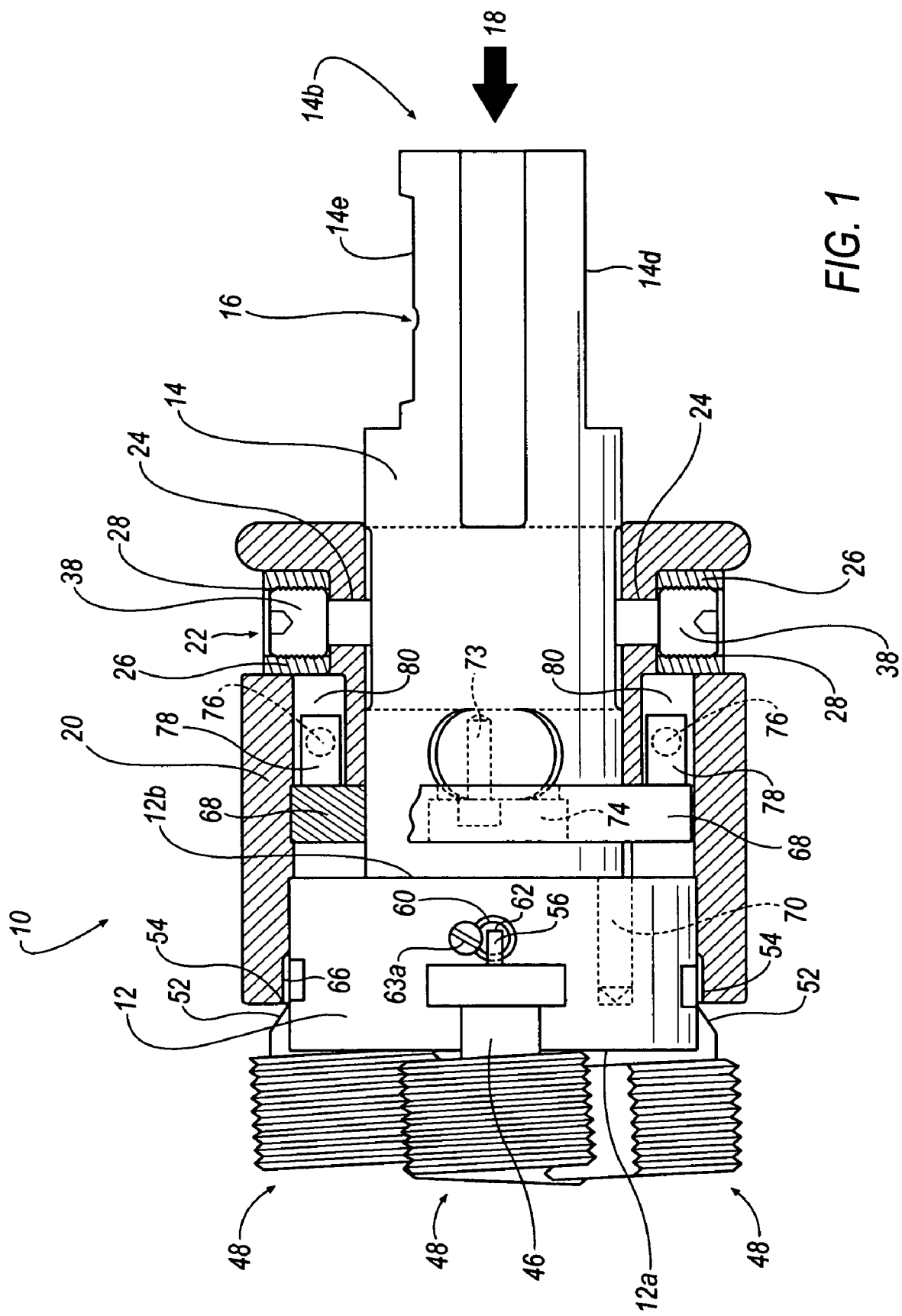
FIG. 1 is a partial sectional view of the die head.

Before explaining in detail the present invention and operation thereof, it is to be noted that the invention is not limited to the details of construction and arrangement of parts which are illustrated in the accompanying drawings, since the invention is capable of other embodiments, and that the phraseology employed is for the purpose of description and not of limitation. It is to be noted that the following preferred embodiment of the invention utilizes a modified Vers-O-Tool Model DRF die head (described in detail in U.S. Pat. No. 1,952,205 herein incorporated by reference) but the present invention is not limited to use with just such model cutting die head but may be incorporated into other die head designs.

With reference to FIGS. 1–7, wherein like numerals designate like components throughout all of the figures, there is illustrated a die head 10 for use in a machine tool generally with either a revolving spindle or a fixed spindle (not shown). The die head 10 comprises a hollow die body 12 having a front face 12a, a rear face 12b, and a hollow shank 14 extending rearwardly from the rear face and terminating in a shank end 14b. The hollow shank 14 has an inner surface 14c, an outer surface 14d, and one or more shank notches 15 in the walls along the shank 14. The outer surface 14d has a flat 14e having a pressure relief hole 16 near the shank end 14b, a circumferential groove 14f near the die body 12, and an axial groove 14g extending axially from the circumferential groove 14f toward the shank end 14b (See FIG. 7). The shank end 14b is adapted for attachment to the spindle of the machine tool (not shown) capable of supplying, for example a fluid 18 from a reservoir as well known in the art (not shown). A sleeve 20 surrounds the die body 12 extending from the front face 12a rearward. The sleeve 20 has a groove, shown generally at 22. The sleeve 20 includes one or more notches 24 (See FIGS. 6–7) extending radially through the base of the groove 22. A split ring 26 (See FIG. 5) having at least one or more threaded holes 28 aligned within the length of the notch(es) 24 is adapted to fit within the groove 22. The split ring 26 is secured in the groove 22 by screws 29 (See FIGS. 5 and 7).

Within the hollow shank 14 near the shank notch(es) 15 is a plunger 30 (see FIGS. 2 & 3) of sufficiently small cross-section to fit within the hollow shank 14. The plunger 30 has a threaded hole 32 on its central axis and a smooth through-hole 34 perpendicular to the threaded hole 32. The threaded hole 32 of the plunger 30 receives a die trip adjusting screw 36. The smooth through-hole 34 is aligned such that at least one pilot screw 38 may threadedly engage a threaded hole 28 of the split ring 26 while passing through a shank notch 15 and fitting into the smooth through-hole 34 of the plunger 30 (See FIG. 2). The sleeve 20 is thus rigidly pinned to the plunger 30 by at least one pilot screw 38.

Situated within the hollow shank 14 between the plunger 30 and the shank end 14b is a pusher 40. The pusher 40 is movable axially within the hollow shank 14. The surface of the pusher 40 is sufficiently sealed against the inner surface 14c of the hollow shank 14 such that there is adequate pressure from the fluid 18, supplied from a reservoir into the center section from the shank end 14*b*, to cause the pusher 40 to slide into and "push" the plunger/sleeve assembly toward the front face 12*a* of the die body 12. The surface of the plunger 40 is sealed against the inner surface 14*c* of the hollow shank by means of at least one o-ring 42 (See FIG. 2). It will be appreciated that excess fluid that passes the pusher 40 can serve as a coolant and/or lubricant for the die head. In an alternative embodiment, the plunger 30 and pusher 40 my be operatively combined into a single element wherein the plunger 30 in addition to functioning as previously described also is sufficiently sealed against the inner surface 14*c* of the hollow shank 14 to be set internally by an increase in pressure of the fluid 18 as previously described.

Figure 7:
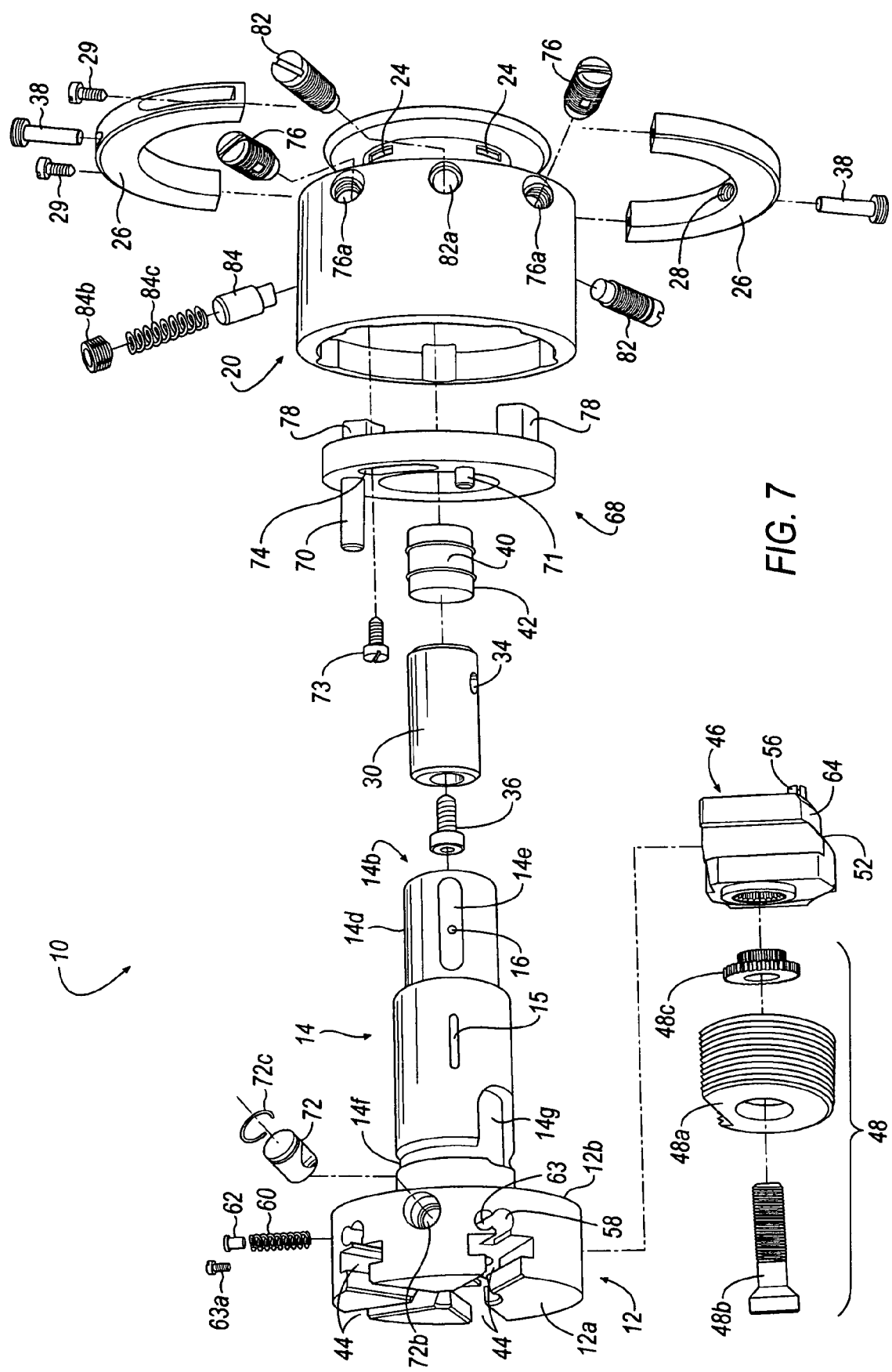
FIG. 7 is an exploded view of the entire die head assembly.

The front face 12*a* is provided with a plurality of receiving slots 44 (see FIG. 7) shown herein as four in number. The number of receiving slots 44 is not limited to four in number but may be more or less as desired for a specific application. Each of the receiving slots 44 is of a T-shaped cross-section for the reception of a one piece, stepped, correspondingly shaped block 46. The block 46 has a cutter 48 suitably secured thereto. The cutters 48 may include, but are not limited to the following: chasers, turning cutters, grooving cutters, burnishing tools, knurling tools, and the like. In a preferred embodiment, the cutter 48 as shown in FIG. 7, includes: a chaser 48*a*, a screw 48*b*, and a serrated bushing 48*c*. Each block 46 has an axial cam surface 52 that interacts with a corresponding axial cam surface 54 on the sleeve 20. Each block 46 is provided with a rearwardly extending pin 56 projecting into a slot 58 in the rear of the T-shaped receiving slots 44 of the front face 12*a*. Each of these slots 58 has a spring 60 and headed plunger 62 located in position to engage the rearwardly extending pin 56 of the block 46 thereby shifting each block 46 along with attached cutter 48 radially outwardly when the sleeve 20 is withdrawn away from the front face 12*a* of the die body 12. Adjoining each slot 58 containing the spring 60 and headed plunger 62 is a threaded hole 63 having a screw 63*a* threadedly engaged to retain the spring 60 and headed plunger 62 and thus the blocks 46 within each of the receiving slots 44. The springs 60 also hold the blocks 46 with their cam surface 52 in engagement with the cam surface 54 of the sleeve 20 and by the action of the springs the cutters 48 are opened or released at the proper time. Each of the blocks 46 is also provided with what is designated as a land surface 64 curved circumferentially of the die but straight in the direction of the depth of the die for cooperation with a radial cam surface 66 of the sleeve 20. Upon relative rotation of the body 12 and sleeve 20, the blocks 46 with attached cutters 48 may be finely adjusted to make the proper cut.

Located within the sleeve 20 is an adjusting ring 68 (See FIGS. 1 & 4) having a fixed guide pin 70 and a fixed stop pin 71 extending toward the rear face 12*b* of the die body 12. The guide pin 70 is positioned to project into an opening in the rear face 12*b* of the die body 12. A float bushing 72 is retained in a radial bale 72*b* in the die body 12 by a spring clip 72*c* (See FIG. 7). The guide pin 70 passes through the float bushing 72 thus preventing radial movement between the die body 12 and the adjusting ring 68 while permitting axial movement between the two. The stop pin 71 provides a gap between the adjusting ring 68 and the rear face 12*b* of the die body 12. The adjusting ring 68 is held against movement axially of the sleeve 20 by a shoulder screw 73 projecting through a slot 74 formed in the adjusting ring 68 that threadedly engages a threaded hole in the sleeve 20 (See FIG. 7). The slot 74 permits rotary movement of the adjusting ring 68 and the sleeve 20. Circumferential movement is obtained by a pair of adjusting screws 76 carried in suitable threaded openings 76*a* of the sleeve 20 (See FIG. 7). These screws 76 engage lugs 78 projecting from the opposite side of the adjusting ring 68 from the guide pin 70. The lugs 78 project into recesses 80 located in the rear wall of the sleeve 20. By adjusting these screws 76, one inward and the other outward, the adjusting ring 68 and the die body 12, owing to the connecting guide pin 70 may be rotated relative to the sleeve 20. This rotary movement of the die body 12 causes the cutters 48 to move radially inward toward the work piece or outwardly therefrom, according to the adjustment desired, owing to the radial cam surfaces 66 hereinbefore referred to on the sleeve 20, which engage the land surfaces 64 of the blocks 46. By this means, the cutters 48 are adjusted for the proper diameter of the work piece to be cut Once the appropriate adjustment is obtained, one or more locking screws 82 carried in suitable threaded openings of the sleeve 82*a* are tightened to prevent relative movement of the sleeve 20 and adjustment ring 68 (See FIG. 7).

Figure 2:
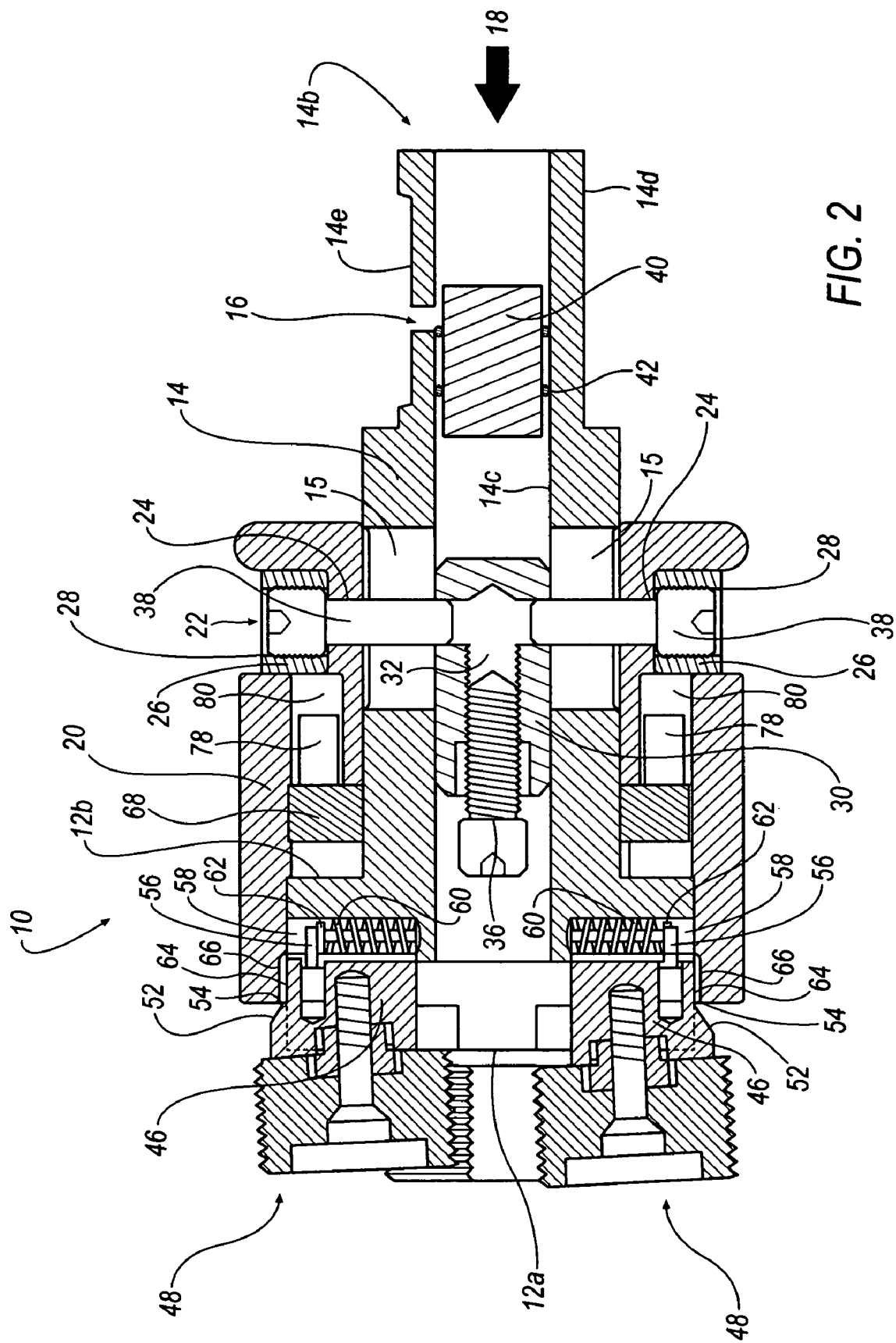
FIG. 2 is a sectional view of the die head.
Figure 3:
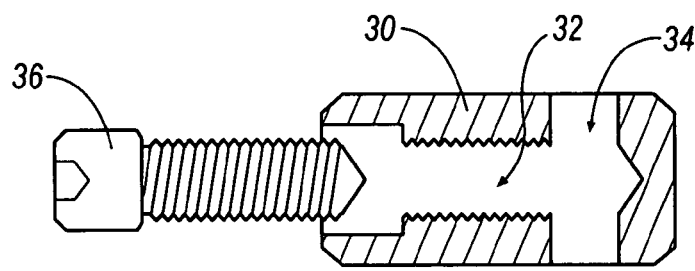
FIG. 3 is a sectional view of the plunger and adjusting screw.
Figure 4:
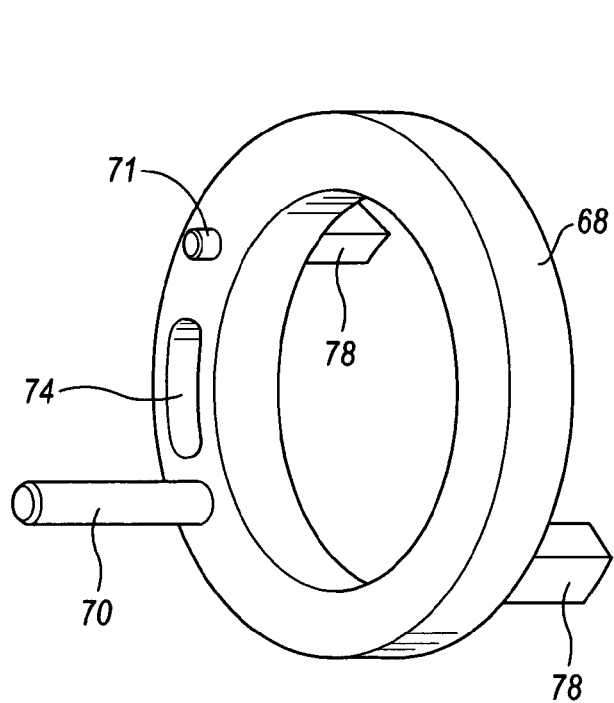
FIG. 4 is a perspective view of the adjusting ring.
Figure 5:
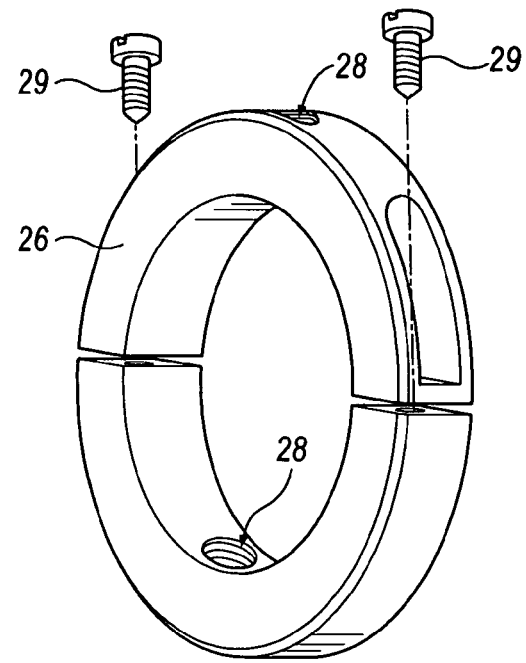
FIG. 5 is a perspective view of the split ring.
Figure 6:
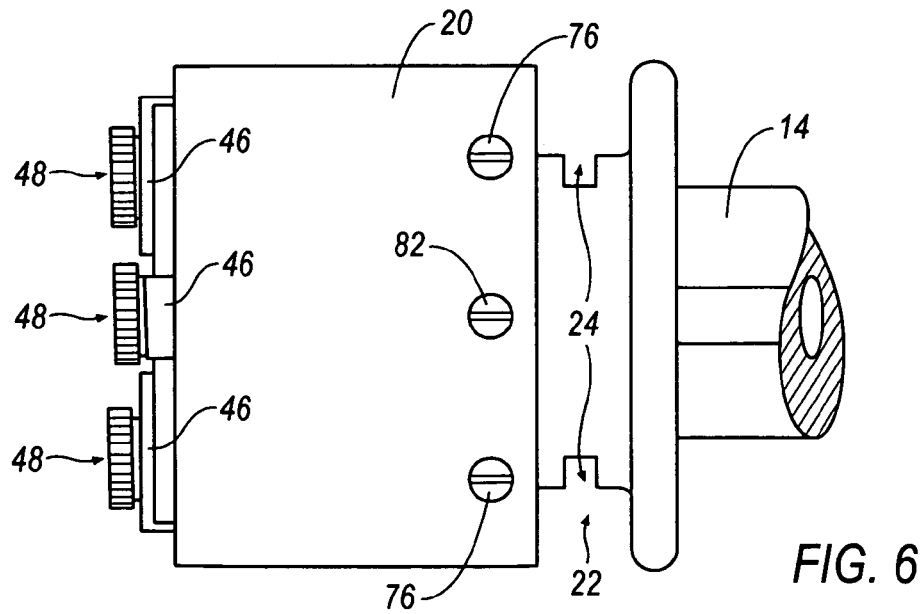
FIG. 6 is a side elevational view of the sleeve and head.

Now, with reference to FIG. 2, a detailed operation of the present invention will be described. The fluid 18, as supplied to the shank end 14*b* of the hollow shank 14 through the spindle of the machine (not shown), may fill and pressurize the hollow shank 14. The pusher 40 is situated such that by pressurizing the interior of the hollow shank 14 with fluid 18, the pusher 40 is caused to slide from the shank end 14*b* of the hollow shank 14 toward the die body 12. As the pusher 40 slides toward the die body 12, the pusher contacts and pushes the plunger 30 and the rigidly attached sleeve 20 toward the front face 12*a*, thus engaging the cutters 48 to the work piece (not shown). Dependent on the application, the work piece or die head may be rotated resulting in the distance between the work piece and die trip adjusting screw 36 of the plunger 30 to decrease. As the work piece (not shown) and adjusting screw 36 engage, the inward movement of the work piece relative to the die head 10 pushes the plunger 30 and sleeve 20 assembly rearward away from the cutters 48 thus tripping the die head 10 and releasing the work piece from the cutters 48. A retaining plunger 84, held in a radial hole in the sleeve 20, limits travel of the sleeve 20 to the length of the axial groove 14*g* (See FIG. 7). The retaining plunger 84 is held in the sleeve 20 by a retaining screw 84*b* and forced into the axial groove 14*g* by a retaining spring 84*c*. Once the work piece is removed, the pressure of the fluid 18 is increased thus resetting the die head 10 for another cutting cycle without application of an external resetting means.

All documents, patents, and patent applications referred to herein are hereby incorporated by reference. While the invention has been specifically described in connection with certain specific embodiments thereof, it is to be understood that this is by way of illustration and not of limitation. Various modifications and additions will become apparent to persons of ordinary skill in the art. All such variations and modifications are intended to be encompassed within the scope of this patent, which is limited only by the claims appended hereto. The scope of the appended claims should be construed as broadly as the prior art will permit.

What is claimed is:

1. A cutting die head comprising:
   a die body having a front face, a rear face and a hollow shank extending inwardly from the rear face and terminating in a shank end; the front face having a plurality of slots each provided with a radially adjustable block, each block having a cutter mounted thereon and a radially outwardly facing cam surface;
   a sleeve surrounding the die body and having an inner surface, the inner surface having a plurality of cam surfaces arranged to communicate with the cam surfaces of the blocks such that axial movement of the sleeve results in radial movement of the blocks;

a plunger positioned within the hollow shank and fixed to the sleeve through a slot in the hollow shank such that the sleeve and plunger move together axially along the shank a distance delineated by the length of the slot; and a fluid in communication with the shank such that an increase in pressure of the fluid results in the plunger and sleeve being forced toward the front face of the die body, thereby causing the blocks to move radially inward.

2. The cutting die head of claim 1, wherein the fluid is air, oil, or coolant.

3. The cutting die head of claim 1, wherein the cutters are selected from form tools, threading tools, grooving cutters, shape cutters, knurling tools, or burnishing tools.

4. The cutting die head of claim 1, wherein part of the fluid may escape from the shank and cool or lubricate the cutting die head.

5. The cutting die head of claim 1, wherein the fluid is sealed within the shank and does not leak from the cutting die head.

6. The cutting die head of claim 1, wherein the die body is cylindrical.

7. The cutting die head of claim 1, wherein the blocks have both axial and radial cam surfaces in communication with corresponding cam surfaces on the sleeve.

8. A cutting die head comprising:

a die body having a front face, a rear face and a hollow shank extending inwardly from the rear face and terminating in a shank end; the front face having a plurality of slots each provided with a radially adjustable block, each block having a cutter mounted thereon and a radially outwardly facing cam surface;

a sleeve surrounding the die body and having an inner surface, the inner surface having a plurality of cam surfaces arranged to communicate with the cam surfaces of the blocks such that axial movement of the sleeve results in radial movement of the blocks;

a plunger positioned within the hollow shank and fixed to the sleeve through a slot in the hollow shank such that the sleeve and plunger move together axially along the shank a distance delineated by the length of the slot;

a pusher positioned within the hollow shank between the plunger and shank end; and a fluid in communication with the shank such that an increase in pressure of the fluid results in the pusher being forced toward the plunger and affixed sleeve being, thus causing the plunger and affixed sleeve toward the front face of the die body causing the blocks to move radially inward.

9. The cutting die head of claim 8, wherein the fluid is air, oil, or coolant.

10. The cutting die head of claim 8, wherein the cutters are selected from form tools, threading tools, grooving cutters, shape cutters, knurling tools, or burnishing tools.

11. The cutting die head of claim 8, wherein part of the fluid may escape from the shank and cool or lubricate the cutting die head.

12. The cutting die head of claim 8, wherein the fluid is sealed within the shank and does not leak from the cutting die head.

13. The cutting die head of claim 8, wherein the die body is cylindrical.

14. The cutting die head of claim 8, wherein the blocks have both axial and radial cam surfaces in communication with corresponding cam surfaces on the sleeve.

* * * * *